United States Patent
Hosono et al.

(10) Patent No.: US 7,507,289 B2
(45) Date of Patent: Mar. 24, 2009

(54) ELECTROCONDUCTIVE 12CAO—7AL2O3 AND COMPOUND OF SAME TYPE, AND METHOD FOR PREPARATION THEREOF

(75) Inventors: Hideo Hosono, Yamato (JP); Masahiro Hirano, Tokyo (JP); Katsuro Hayashi, Kawasaki (JP); Masashi Miyakawa, Yokohama (JP); Isao Tanaka, Kofu (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 327 days.

(21) Appl. No.: 10/561,968

(22) PCT Filed: Feb. 12, 2004

(86) PCT No.: PCT/JP2004/001507

§ 371 (c)(1),
(2), (4) Date: Dec. 22, 2005

(87) PCT Pub. No.: WO2005/000741

PCT Pub. Date: Jan. 6, 2005

(65) Prior Publication Data

US 2006/0151311 A1     Jul. 13, 2006

(30) Foreign Application Priority Data

Jun. 26, 2003   (JP) .............................. 2003-183605

(51) Int. Cl.
*C30B 1/10* (2006.01)
(52) U.S. Cl. ................. 117/4; 117/2; 117/3; 117/7; 117/8; 117/940; 252/62.3 C
(58) Field of Classification Search ............... 117/2, 117/3, 4, 7, 8, 940; 252/62.3 C
See application file for complete search history.

(56) References Cited

U.S. PATENT DOCUMENTS 5,675,972 A    10/1997 Edelson
2005/0061657 A1    3/2005 Hosono et al.

FOREIGN PATENT DOCUMENTS

JP    2002-003218    1/2002

(Continued)

OTHER PUBLICATIONS

Andrew S. Ichimura et al.; "Toward Inorganic Electrides", J. Am. Chem. Soc., vol. 124, No. 7, 2002, pp. 1170-1171. Cited in the ISR.

(Continued)

*Primary Examiner*—Robert M Kunemund
(74) *Attorney, Agent, or Firm*—Westerman, Hattori, Daniels & Adrian, LLP.

(57) ABSTRACT

In a solid solution system of $Al_2O_3$ and CAO or SrO, it has been difficult to obtain a material having a high electrical conductivity ($>10^{-4}$ S·cm⁻) at room temperature.

A compound is provided in which electrons at a high concentration are introduced into a $12CaO.7Al_2O_3$ compound, a $12SrO.7Al_2O_3$ compound, or a mixed crystal compound containing $12CaO.7Al_2O_3$ and $12SrO.7Al_2O_3$. The compound formed by substituting all the free oxygen ions with electrons is regarded as an electride compound in which $[Ca_{24}Al_{28}O_{64}]^{4+}(4e^-)$ or $[Sr_{24}Al_{28}O_{64}]^{4+}(4e^-)$ serves as a cation and electrons serve as anions. When a single crystal or a hydrostatic pressure press molded material of a fine powder thereof is held at approximately 700° C. in an alkaline metal vapor or an alkaline earth metal vapor, melt of a hydrostatic pressure press molded material of a powder is held at approximately 1,600° C. in a carbon crucible, followed by slow cooling for solidification, or a thin film of the compound held at approximately 600° C. is implanted with rare gas ions, a great number of the free oxygen ions can be substituted with electrons.

9 Claims, 2 Drawing Sheets

FOREIGN PATENT DOCUMENTS

| | | |
|---|---|---|
| JP | 2002-348117 | 4/2002 |
| JP | 2002-316867 | 10/2002 |
| JP | 2003-040697 | 2/2003 |
| JP | 2003-238149 | 8/2003 |
| JP | 2004-26608 | 1/2004 |
| WO | WO03/089373 | 10/2003 |

OTHER PUBLICATIONS

Satoru Matsuishi et al.; High-Density Electron Anions in a Nanoporous Singe Crystal $[Ca_{24}Al_{28}O_{64}]^{4+}(4e^-)$, Science, vol. 301, Aug. 1, 2003, Cited in the ISR.

H. Hosono et al.; "12CaO $7Al_2O_3$ crystal containing calthrated hyperoxide ion radicals called phantom chemical species in high concentration", vol. 33, No. 4, 1996, pp. 171-172. Cited in the spec.

O. Yamaguchi et al.; "New Compound in the System SrO-$Al_2O_3$", J. Am. Ceram. Soc., vol. 69, No. 2, pp. C-36-C37. Cited in the spec.

Frederik J. Tehan et al.; "Alkali Anions. Preparation and Crystal Structure of a Compound Which Contains the Cryptated Sodium Cation and the Sodium Anion", Journal of the American Chemical Society, vol. 96, No. 23, Nov. 13, 1974, pp. 7203-7204. Cited in the spec.

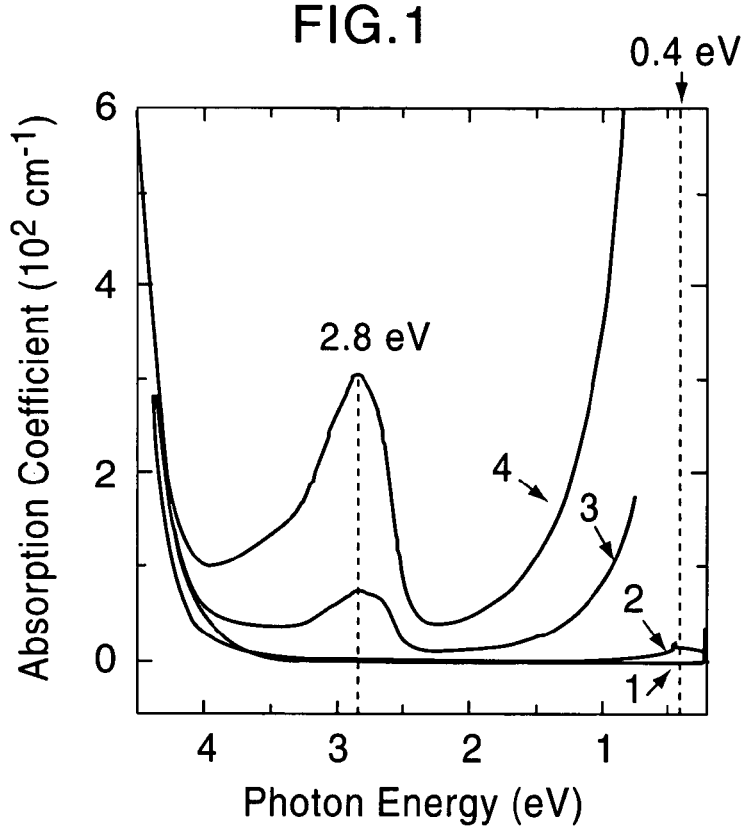
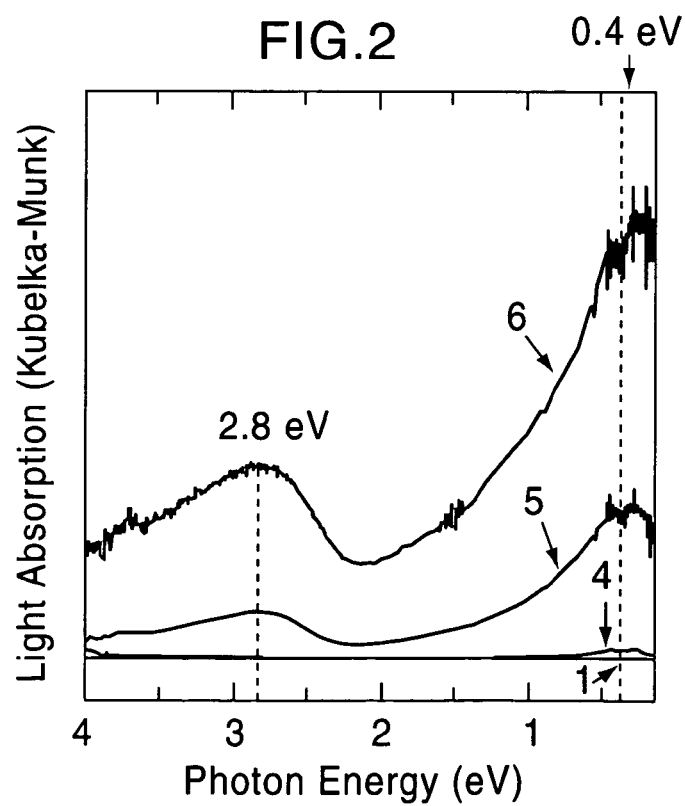

ELECTROCONDUCTIVE 12CAO—7AL2O3 AND COMPOUND OF SAME TYPE, AND METHOD FOR PREPARATION THEREOF

TECHNICAL FIELD

The present invention relates to a 12CaO·7Al$_2$O$_3$ (hereinafter referred to as "C12A7") compound, a 12SrO·7Al$_2$O$_3$ compound (hereinafter referred to as "S12A7"), or a mixed crystal compound containing of 12CaO·7Al$_2$O$_3$ and 12SrO·7Al$_2$O$_3$, the compounds each containing electrons at a high concentration, to methods for manufacturing the above compounds, and to application thereof.

BACKGROUND ART

In 1970, H. B. Bartl et al. disclosed a very unique characteristic of a 12A7 crystal in which 2 oxygen atoms out of 66 oxygen atoms in a unit cell containing 2 molecules are clathrated in the form of "free oxygen" in space of cages present in the crystal (Non-Patent Document 1). Subsequently, it has also been disclosed that the free oxygen can be substituted with various types of anions.

Hosono, one of the inventors of the present invention, discovered that O$_2^-$ at a concentration of approximately 1×10$^{19}$ cm$^{-3}$ is clathrated by measuring electron spin resonance of a C12A7 crystal that was synthesized by a solid phase reaction at 1,200° C. in air using CaCO$_3$ and Al$_2$O$_3$ or Al(OH)$_3$ as raw materials and has proposed a model in that part of the free oxygen ions, that are in the form of O$_2^-$, are present in the cages (Non-Patent Document 2).

The inventors of the present invention further discovered that when a raw material containing calcium and aluminum at an atomic equivalent ratio of approximately 12:14 is subjected to a solid phase reaction under controlled atmospheric and temperature conditions, a C12A7 compound can be obtained in which an active oxygen species at a high concentration of 10$^{20}$ cm$^{-3}$ or more is clathrated. Patent applications of the above compound itself, a manufacturing method thereof, means for extracting the clathrated ions, a method of identifying active oxygen ion radicals, and application of the compound were filed (Patent Document 1).

In addition, a method for clathrating and/or extracting active oxygen at approximately 700° C. by controlling an anion ion concentration of OH$^{-1}$ or the like other than oxygen in the compound was further discovered, and a patent application thereof was also filed (Patent Document 2). Furthermore, it was also discovered that when an electric field is applied to a C12A7 compound containing active oxygen at a high concentration, high density O$^-$ ion beams can be obtained, and a patent application relating to this invention was also filed (Patent Document 3).

In addition, a C12A7 compound containing OH$^{-1}$ ions at a concentration of 10$^{21}$ cm$^{-3}$ or more was synthesized by firing a powdered C12A7 compound in an oxygen atmosphere which was obtained by hydration reaction in water, a solvent containing H$_2$O, or a gas containing a water vapor, and patent applications of the above compound itself, a manufacturing method thereof, a method for identifying OH$^-$ ions, and application of the compound were also filed (Patent Document 4).

In addition, it was also discovered that a C12A7 compound containing hydrogen anions is a material having high speed ion conductivity, and that the hydrogen anions can be extracted into vacuum by application of an electric field. Furthermore, the following were also discovered that green coloration occurs when UV or x-ray irradiation is performed and that an electrical insulator is permanently changed to an electrical conductor simultaneously with the above coloration and can again be returned to an insulating state by heating or intense visible light irradiation, and a patent application of the use of the above phenomena was also filed (Patent Document 5).

In addition, as a compound having a crystal structure identical with that of the C12A7 compound, a S12A7 compound has been known (Non-Patent Document 3). The inventors of the present invention also filed patent applications of a synthetic method of a S12A7 compound, a method for clathrating active oxygen ions, and application of the compound (Patent Document 6).

Furthermore, the inventors of the present invention also discovered that an electrical conductance of 10$^{-6}$S/cm$^3$ or more can be obtained when C12A7, S12A7, and a mixed crystal compound thereof clathrate an alkaline metal or ions, and a patent application of this discovery was also filed (Patent Document 7).

An electride compound is the concept that J. L. Dye first proposed (Non-Patent Document 4) and was first realized, for example, by a compound containing a crown ether as a cation and electrons as anions. The electride has been known as a material that exhibits electrical conductivity by hopping of electrons contained as anions. Subsequently, several organic electrides were discovered; however, these compounds are stable only at a low temperature, such as approximately 100 K or less, and are considerably unstable materials so as to react with air and/or water.

In recent years, an inorganic electride compound was discovered that was formed by doping cesium into a powdered zeolite compound containing silica as a skeleton thereof. In order to obtain stability at room temperature, this compound was prepared so as to enable silica zeolite to serve like a crown ether for forming a complex. However, this compound has also high reactivity with moisture and is chemically unstable (Non-Patent Document 5). In addition, a diode has also been proposed that uses superior electron emission properties of an electride compound (Patent Document 8); however, since the electride compounds that have been obtained as of today are unstable from thermal and chemical points of view, the proposed vacuum diode can only be operated at a low temperature.

Patent Document 1 Japanese Patent Application No. 2001-49524 (Japanese Unexamined Patent Application Publication No. 2002-3218)

Patent Document 2 Japanese Patent Application No. 2001-226843 (Japanese Unexamined Patent Application Publication No. 2003-40697)

Patent Document 3 Japanese Patent Application No. 2001-377293

Patent Document 4 Japanese Patent Application No. 2001-117546 (Japanese Unexamined Patent Application Publication No. 2002-316867)

Patent Document 5 Japanese Patent Application No. 2002-117314

Patent Document 6 Japanese Patent Application No. 2002-045302 (Japanese Unexamined Patent Application Publication No. 2003-238149)

Patent Document 7 Japanese Patent Application No. 2002-188561

Patent Document 8 U.S. Pat. No. 5,675,972 Specification and Drawings

Non-Patent Document 1 H. B. Bartl and T. Scheller, Neuses Jarhrb. Mineral, Monatsh. (1970), 547

Non-Patent Document 2 H. Hosono and Y. Abe, Inorg. Chem. 26, 1193, (1987), "Zairyo Kagaku (Material Science)", vol. 33, No. 4, pp. 171 to 172, (1996)

Non-Patent Document 3 O. Yamaguchi et al., J. Am. Ceram. Soc. 69[2]C-36, (1986)

Non-Patent Document 4 F. J. Tehan, B. L. Barrett, J. L. Dye, J. Am. Chem. Soc., 96, 7203 to 7208 (1974)

Non-Patent Document 5 A. S. Ichimura, J. L. Dye, M. A. Camblor, L. A. Villaescusa, J. Am. Chem. Soc., 124, 1170, (2002)

DISCLOSURE OF INVENTION (Problems to be Solved by the Invention)

Heretofore, in a solid solution system of $Al_2O_3$ and $CaO$ or $SrO$, it has been difficult to obtain a material having a high electrical conductivity ($>10^{-4}$ $S \cdot cm^{-1}$) at room temperature. In addition, in the above-described C12A7, S12A7, and mixed crystal compound thereof, which clathrate hydrogen anions, treatment of UV irradiation is required to realize a permanent electrical conductivity, and when the temperature is increased, for example, there has been a problem in that the electrical conductivity is decreased.

In addition, as for a method for obtaining electrical conductivity by clathrating an alkaline metal, it is difficult to clathrate a large amount of an alkaline metal or ions thereof inside the compound, and as a result, there has been a problem in that high electrical conductivity is not easily obtained. That is, by the methods for clathrating hydrogen ions and alkaline metal ions, free oxygen ions at a high concentration or the entire thereof contained in C12A7, S12A7, or the mixed crystal compound thereof could not be substituted with electrons.

Means for Solving the Problems

Through intensive research carried out based on knowledge obtained from the investigation on C12A7, S12A7 or the mixed crystal compound, which clathrate hydrogen anions and alkaline metal ions, the inventors of the present invention discovered that when a single crystal of C12A7, S12A7, or a mixed crystal compound thereof, or a hydrostatic pressure press molded material of a fine powder thereof is held in an alkaline metal vapor or an alkaline earth metal vapor at a high temperature, black green coloration occurs although UV irradiation is not performed, and that at the same time, a high electrical conductivity of 1 S/cm or more is obtained.

An optical absorption spectrum, a photo electron spectrum, an x-ray diffraction spectrum, and the like of the above compound were analyzed, and it was found that almost all the free oxygen ions in the C12A7 compound, the S12A7 compound, or the mixed crystal compound thereof are extracted, and 2 electrons per 1 oxygen ion thus extracted are allowed to remain in the compound.

When the free oxygen ions contained in the C12A7 compound or the S12A7 compound are all substituted with electrons (referred to as $e^-$), the compound is represented by $[Ca_{24}Al_{28}O_{64}]^{4+}(4e^-)$ or $[Sr_{24}Al_{28}O_{64}]^{4+}(4e^-)$. The compound may be regarded as an electride compound in which $[Ca_{24}Al_{28}O_{64}]^{4+}$ or $[Sr_{24}Al_{28}O_{64}]^{4+}$ serves as a cation and electrons serve as anions.

In addition, it was also discovered that when a fine powder of the C12A7 compound, the S12A7 compound, or the mixed crystal compound thereof is preferably molded using a hydrostatic pressure press and is then held to be melted in a reducing atmosphere, preferably in a carbon crucible provided with a lid, at approximately 1,600° C., followed by slow cooling to be solidified, almost all the free oxygen ions can be substituted with electrons in the solidified state. Furthermore, it was also discovered that when a thin film of the C12A7 compound, the S12A7 compound, or the mixed crystal compound thereof, which is held at a temperature of 500 to 1,400° C. and most preferably at 600° C., is implanted with rare gas ions, a great number of the free oxygen ions can be substituted with electrons.

The present invention provides a method for permanently changing the C12A7 compound, the S12A7 compound, or the mixed crystal compound thereof, which is inherently an electrical insulator, into an electrical conductor by the following treatment. That is, there is treatment of holding the C12A7 compound, the S12A7 compound, or the mixed crystal compound thereof, which is a stable solid material, in an alkaline metal vapor or an alkaline earth metal vapor at a high temperature; treatment of holding melt of the above compound in a carbon crucible at a high temperature, followed by slow cooling to be solidified; or treatment of implanting noble gas ions into a heated thin film of the above compound.

In particular, by the treatment of using an alkaline metal vapor or an alkaline earth metal vapor at a high temperature, or the treatment of holding melt of the compound in a carbon crucible at a high temperature, followed by slow cooling to be solidified, almost all the free oxygen ions can be extracted and can be substituted with electrons, and as a result, a thermally and chemically stable inorganic solid electride compound can be manufactured. The stable solid electride compound can be used as an electron emission material operable at room temperature. In addition, since electrons have a strong reducing effect, when a compound and an electride compound, in which the free oxygen ions are substituted with electrons, are further exposed to an oxygen atmosphere or are brought into contact with a compound containing oxygen, the oxygen is strongly absorbed by the above compounds; hence, the above compounds and powders thereof can be used as a reducing agent.

Furthermore, the present invention provides a method for selectively clathrating a large amount of $O^-$, $H^-$, or $N^-$ in the C12A7 compound, the S12A7 compound, or the mixed crystal thereof, by heating the electride compound in an oxygen, a hydrogen, or a nitrogen atmosphere so as to substitute electrons with the anions.

That is, the present invention includes the following.

(1) A $12CaO \cdot 7Al_2O_3$ compound is provided containing electrons substituted for free oxygen ions at a concentration of $1 \times 10^{18}$ to less than $1.1 \times 10^{21}/cm^3$ out of free oxygen ions contained in cages at a substitution ratio of the electrons to the free oxygen ions of 2 to 1, the concentration of the electrons being $2 \times 10^{18}$ to less than $2.2 \times 10^{21}/cm^3$ in the cages, the compound having an electrical conductivity of $10^{-4}$ S/cm to less than $10^3$ S/cm at room temperature.

(2) A $12SrO \cdot 7Al_2O_3$ compound is provided containing electrons substituted for free oxygen ions at a concentration of $1 \times 10^{18}$ to less than $1.1 \times 10^{21}/cm^3$ out of free oxygen ions contained in cages at a substitution ratio of the electrons to the free oxygen ions of 2 to 1, the concentration of the electrons being $2 \times 10^{18}$ to less than $2.2 \times 10^{21}/cm^3$ in the cages, the compound having an electrical conductivity of $10^{-4}$ S/cm to less than $10^3$ S/cm at room temperature.

(3) A mixed crystal compound containing $12CaO \cdot 7Al_2O_3$ and $12SrO \cdot 7Al_2O_3$ is provided which contains electrons substituted for free oxygen ions at a concentration of $1 \times 10^{18}$ to less than $1.1 \times 10^{21}/cm^3$ out of free oxygen ions contained in cages at a substitution ratio of the electrons to the free oxygen ions of 2 to 1, the concentration of the electrons being $2 \times 10^{18}$ to less than $2.2 \times 10^{21}/cm^3$ in the cages, the compound having an electrical conductivity of $10^{-4}$ S/cm to less than $10^3$ S/cm at room temperature.

(4) An electride 12CaO.7Al$_2$O$_3$ compound is provided containing electrons that are substituted for almost all free oxygen ions contained in cages at a substitution ratio of the electrons (referred to as e$^-$) to the oxygen ions of 2 to 1, the electride 12CaO.7Al$_2$O$_3$ compound being practically represented by [Ca$_{24}$Al$_{28}$O$_{64}$]$^{4+}$(4e$^-$).

(5) An electride 12SrO.7Al$_2$O$_3$ compound is provided containing electrons that are substituted for almost all free oxygen ions contained in cages at a substitution ratio of the electrons to the oxygen ions of 2 to 1, the electride 12SrO.7Al$_2$O$_3$ compound being practically represented by [Sr$_{24}$Al$_{28}$O$_{64}$]$^{4+}$(4e$^-$).

(6) A mixed crystal electride compound containing a 12CaO.7Al$_2$O$_3$ compound and a 12SrO.7Al$_2$O$_3$ compound, is provided containing electrons that are substituted for almost all free oxygen ions contained in cages at a substitution ratio of the electrons to the oxygen ions of 2 to 1, the mixed crystal electride compound being practically represented by [(Ca$_{1-x}$Sr$_x$)$_{24}$Al$_{28}$O$_{64}$]$^{4+}$(4e$^-$).

(7) A method for manufacturing the compound described in one of the above (1) to (6) is provided that comprises the step of holding a single crystal 12CaO.7Al$_2$O$_3$ compound or a hydrostatic pressure press molded material of a fine powder thereof, a single crystal 12SrO.7Al$_2$O$_3$ compound or a hydrostatic pressure press molded material of a fine powder thereof, or a single crystal of a mixed crystal compound containing a 12CaO.7Al$_2$O$_3$ compound and a 12SrO.7Al$_2$O$_3$ compound or a hydrostatic pressure press molded material of a fine powder thereof at 600 to 800° C. for 4 to less than 240 hours in an alkaline metal vapor or an alkaline earth metal vapor, whereby electrons are substituted for the free oxygen ions.

(8) In the method for manufacturing the compound, described above, sodium or lithium is used as the alkaline metal, and magnesium or calcium is used as the alkaline earth metal.

(9) A method for manufacturing the compound described in one of the above (1) to (6) is provided that comprises melting one fine powder of the 12CaO.7Al$_2$O$_3$ compound, the 12SrO.7Al$_2$O$_3$ compound, and the mixed crystal compound containing a 12CaO.7Al$_2$O$_3$ compound and a 12SrO.7Al$_2$O$_3$ compound, followed by cooling and solidification, whereby electrons are substituted for the free oxygen ions.

(10) In the method for manufacturing the compound described in the above (9), a melt of one fine powder of the 12CaO.7Al$_2$O$_3$ compound, the 12SrO.7Al$_2$O$_3$, and the mixed crystal compound containing a 12CaO.7Al$_2$O$_3$ compound and a 12SrO.7Al$_2$O$_3$ compound is held at more than 1,550° C. to less than 1,650° C. for more than 1 minute to less than 2 hours in a reducing atmosphere, followed by slow cooling to room temperature.

(11) In the method for manufacturing the compound described in the above (9), the reducing atmosphere in the above (10) is an atmosphere in a carbon crucible capped with a lid.

(12) A method for manufacturing the compound according to one of Claims 1 to 3 is provided that comprises the steps of holding one thin film made of the 12CaO.7Al$_2$O$_3$ compound, the 12SrO.7Al$_2$O$_3$ compound, or the mixed crystal compound containing a 12CaO.7Al$_2$O$_3$ compound and a 12SrO.7Al$_2$O$_3$ compound at 500 to 1,400° C., and implanting rare gas ions (Ar, Kr, or Xe) into the thin film of the compound, whereby electrons are substituted for the free oxygen ions.

(13) A method for clathrating O$^-$, H$^-$, or N$^-$ having a high concentration of $1 \times 10^{18}$/cm$^3$ or more and a high purity in one of a 12CaO.7Al$_2$O$_3$ compound, a 12SrO.7Al$_2$O$_3$ compound, and a mixed crystal compound containing a 12CaO.7Al$_2$O$_3$ compound and a 12SrO.7Al$_2$O$_3$ compound is provided that comprises the step of using one of the compounds described in the above (1) to (6) as a starting material.

(14) A compound clathrating N$^-$ ions at a concentration of $1 \times 10^{18}$/cm$^3$ or more is provided, the compound being one of the 12CaO.7Al$_2$O$_3$ compound, the 12SrO.7Al$_2$O$_3$ compound, and the mixed crystal compound containing a 12CaO.7Al$_2$O$_3$ compound and a 12SrO.7Al$_2$O$_3$ compound, which is produced by the method described in the above (11).

(15) An electron emission material is provided that uses one of the compounds described in the above (1) to (6).

(16) A reducing material is provided that uses one of the compounds described in the above (1) to (6).

BRIEF DESCRIPTION OF THE DRAWINGS

FIG. 1 is a graph showing optical absorption spectra of samples 1 to 4 in example 1.

FIG. 2 is a graph showing optical absorption spectra obtained from diffused reflection spectra of samples 5 and 6 in example 1 by the Kubelka-Munk method.

BEST MODE FOR CARRYING OUT THE INVENTION

Figure 3:
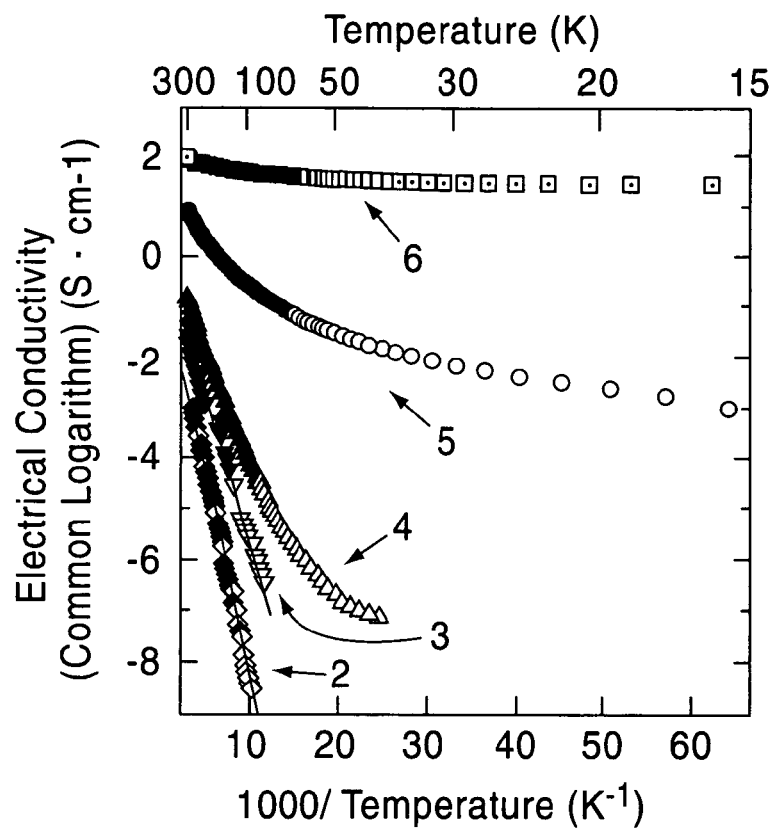
FIG. 3 is a graph showing the temperature dependence of electrical conductivity of samples 1 to 6 in example 1.

As a starting material used in the present invention, a pure C12A7 compound may be used, and in addition, as long as the crystal structure of the C12A7 compound is not destroyed in process, a mixed crystal or a solid solution (hereinafter referred to as "isomorphic compound"), in which parts of calcium and aluminum or all of them are substituted with other elements, having a crystal structure equivalent to the C12A7 compound may also be used.

As a compound having a crystal structure isomorphic to that of the C12A7 compound, a S12A7 compound is currently known, and the mixing ratios of Ca and Sr can be optionally changed. That is, a mixed crystal compound containing C12A7 and S12A7 may also be used. In addition, types of anions and the amounts thereof which are originally clathrated in a starting material have not significant influences on a substitution effect in which free oxygen ions are extracted and substituted with electrons. Furthermore, the form of a starting material may be one of a powder, a film, a polycrystal, and a single crystal.

The C12A7 compound that is used as a starting material is synthesized using a raw material containing calcium and aluminum at an atomic ratio of 12 to 14, followed by a solid phase reaction at a firing temperature of 1,200° C. to less than 1,415° C. A typical raw material includes calcium carbonate and aluminum oxide.

A single crystal can be formed using the C12A7 compound obtained by a solid phase reaction as a precursor by a floating zone method (FZ method). For the growth of a single crystal C12A7 compound, while infrared light are converged to a ceramic precursor in the form of a rod, the precursor rod is being lifted up to move a melt zone, so that the single crystal is continuously grown at the interface between the melt and a solidification portion. The inventors of the present invention filed patent applications on a single crystal C12A7 compound containing an active oxygen species at a high concentration and on a method for manufacturing a single crystal C12A7 compound containing no air bubbles (Patent Document 2; Japanese Patent Application No. 2001-226843, Japanese Unexamined Patent Application Publication No. 2003-40697).

After a single crystal of the C12A7 compound or that of the isomorphic compound, used as a starting material, is held in an alkaline metal vapor or an alkaline earth metal vapor atmosphere at 600° C. to less than 800° C., or preferably at 700° C., for 4 to 240 hours, cooling is performed at a rate of approximately 300° C./hour to room temperature. The alkaline metal vapor or an alkaline earth metal vapor atmosphere may be formed by enclosing a piece or a powder of an alkali metal or an alkaline earth metal together with the starting material in a container, such as a quartz glass, having thermal and chemical durability under vacuum conditions.

Since an alkaline metal may be clathrated in a single crystal of the C12A7 compound or that of the isomorphic compound in some cases, in order to extract free oxygen, an alkaline earth metal vapor, which is unlikely to be clathrated, is preferably used. When the starting material is the C12A7 compound, a calcium metal vapor contained in the starting material is most preferable. An alkaline metal vapor or an alkaline earth metal vapor is deposited on a surface of the single crystal and is allowed to react with free oxygen clathrated inside the single crystal, and when calcium is used by way of example, a calcium oxide layer is formed on the surface. When the temperature holding the single crystal is less than 600° C. and particularly 500° C. or less, the reaction of extracting free oxygen is considerably slow, and when the temperature is 800° C. or more, the reaction of extracting free oxygen rapidly proceeds, so that the C12A7 compound and the isomorphic compound are decomposed.

As the holding time is increased, the amount of free oxygen ions which is extracted is increased, and as a result, the thickness of the calcium oxide layer on the surface is increased. When the holding is performed at 700° C. for 240 hours, almost all the free oxygen ions are extracted and are substituted with electrons, and as a result, an electride C12A7 compound is formed inside the calcium oxide layer. The amount of free oxide ions thus extracted can be evaluated from an x-ray diffraction spectrum, the thickness of the calcium oxide layer, the intensity of an optical absorption band having a peak at 0.4 eV, and the electrical conductivity.

After a fine powder of the C12A7 compound and that of the isomorphic compound, which are used as a starting material, are molded using a uniaxial press, additional molding is performed using a hydrostatic pressure press. When the starting material is molded beforehand to be processed by a hydrostatic pressure press, the first uniaxial pressing may be omitted. The molding pressure by the uniaxial press is set to approximately 200 kg/cm$^2$ to 400 kg/cm$^2$, and preferably approximately 300 kg/cm$^2$, and the molding pressure by the hydrostatic pressure press is preferably set to approximately 2,000 kg/cm$^2$.

After the molded body thus obtained is placed in a reducing atmosphere, preferably in a carbon crucible capped with a lid, the crucible is placed in an alumina crucible capped with a lid, is then heated to 1,550° C. to less than 1,650° C., preferably approximately 1,600° C. where the molded body is melted, and the melt is held at the above temperature for 1 minute to less than 2 hours, preferably 1 hour, followed by cooling to be solidified. When the holding temperature is higher than the above temperature range, a single phase of the C12A7 compound and that of the isomorphic compound cannot be formed. In addition, when the holding temperature is less than 1,550° C., although a single phase of the C12A7 compound and that of the isomorphic compound can be produced, the substitution of electrons for free oxygen may not occur. In addition, when the holding time is less than 1 minute, free oxygen at a concentration of less than $1\times10^{18}$/cm$^3$ can only be substituted with electrons. In addition, since almost all the free oxygen ions are substituted with electrons within 2 hours, the holding time is not necessarily set to 2 hours or more.

It is believed that by performing pressure molding of the powder at the pressure as described above, the rate of reaction of extracting free oxygen is moderated, and hence even after extracting the free oxygen, the C12A7 compound can be obtained. When the reaction of extracting the free oxygen is carried out for a compound in the form of a fine powder without performing pressure molding, the product is decomposed into a 3CaO.Al$_2$O$_3$ phase (C3A) or a CaO.Al$_2$O$_3$ phase (CA), and since the cages are not present in these phases, electrons cannot be clathrated therein.

The temperature increase rate is set to approximately 400° C./hour. Cooling is performed to room temperature at a temperature decreasing rate of approximately 400° C./hour. The temperature increasing rate has not significant influence on the product, and in a conventional electric furnace, a rate of approximately 400° C./hour is easily obtained. When the temperature increasing rate is considerably higher, such as 500° C./hour or more, an electric furnace having a large capacity is required. When the temperature decreasing rate is considerably higher, such as 500° C./hour or more, the product to be obtained tends to become a glass phase, and hence crystallization is unlikely to occur.

Although the product may be obtained when the carbon crucible is directly placed in an electric furnace, in order to avoid contamination caused by heaters of the electric furnace, and in addition, in order to moderate reaction between the carbon crucible and the air, the carbon crucible is preferably placed in an alumina crucible. The product thus obtained is black (powder is green), and by x-ray diffraction, a C12A7 phase can be identified. In addition, an electrical conductivity of approximately 1 S/cm is obtained, so that the substitution of electrons for free oxygen ions can be confirmed.

A polycrystalline thin film of the C12A7 compound and that of the isomorphic compound can be obtained by forming an amorphous film on a MgO substrate by a pulse laser deposition method using a sintered body of the compound as a target, and then holding the film at approximately 1,100° C. in air.

The polycrystalline thin film of the C12A7 compound or the isomorphic compound deposited on the MgO substrate is held at 600° C. and is then implanted with Ar ions which are accelerated at approximately 360 kV. The thin film before ion implantation exhibits electrical insulating properties. By a dose of $5\times10^{17}$/cm$^2$, an electrical conductivity of approximately 1 S/cm can be obtained. From a Rutherford backscattering spectrum, it is confirmed that Ar ions are not contained in the film. Hence, it is believed that after Ar ions collide with free oxygen ions, the free oxygen ions are kicked out of the film by a knock-on effect, and as a result, in order to maintain the electrical neutrality, electrons are allowed to remain in the film.

In the electride C12A7 compound from which free oxygen ions are extracted, in order to maintain the electrical neutrality, 2 electrons per one oxygen ion are allowed to remain in the compound. The electrons thus substituted for free oxygen ions are loosely confined in the cages and are able to move between the cages by hopping. Since the concentration of the free oxygen ions in the compound is approximately $1.1\times10^{21}$/cm$^3$, when the entire thereof is substituted with electrons, the concentration of electrons reaches $2.2 \times 10^{21}/cm^3$. Since the mobility of electron at room temperature is approximately 0.1 $cm^2/(V \cdot sec)$, the electrical conductivity is approximately 100 S/cm. In addition, by the electrons which are loosely confined in the cages, two optical absorption bands having peaks at 0.4 eV and 2.8 eV are generated. Hence, as the amount of clathrated electrons is increased, the C12A7 compound is colored in yellow, green, and black green in that order. From the intensities of the absorption bands, the amount of clathrated electrons can be determined.

Since electrons contained in the C12A7 compound and those in the isomorphic compound are loosely confined in the cages, when a high electric field is applied thereto from the outside, the electrons can be extracted from the compound at room temperature. That is, the C12A7 compound and the isomorphic compound, containing a large amount of electrons, can be used as an electron emission material. Electron emission may occur in a wide temperature range, and even at room temperature, a current of approximately 10 µA can be obtained.

In the C12A7 compound and the isomorphic compound in which almost all the free oxygen ions are substituted with electrons, electrons are only clathrated in the cages, and substantially no anions are clathrated therein. When the C12A7 compound or the isomorphic compound is held at a high temperature in a pure specific gas molecule, ion, or radical atmosphere, the molecules, the ions, or the radicals are enclosed in the C12A7 compound or the isomorphic compound replacing the electrons in the cages so as to be clathrated in the cages as univalent anions.

That is, when the electride C12A7 compound or isomorphic compound is held in the above atmosphere, a C12A7 compound or an isomorphic compound that selectively clathrates specific monovalent anions at a high concentration can be formed. As the specific gas molecules, oxygen, hydrogen, and nitrogen may be used, and as a result, a C12A7 compound or an isomorphic compound that selectively clathrates $O^-$, $H^-$, or $N^-$ at a high concentration can be formed.

The C12A7 compound or the isomorphic compound, clathrating $O^-$ ions can be used as an oxidation catalyst, an $O^-$ beam emission material, and the like (see Patent Document 1). The C12A7 compound or the isomorphic compound, clathrating $H^-$ ions can be used for the formation of a conductive pattern by UV irradiation and can also used as a $H^-$ beam emission material, and the like (see Patent Document 5). In addition, the C12A7 compound or the isomorphic compound, clathrating $N^-$ ions, is expected to be used as a nitridation catalyst.

EXAMPLES

Next, the present invention will be further described in detail with reference to examples.

Example 1

A single crystal C12A7 compound formed by a floating zone method (FZ method) was processed into a thin plate having a size of 0.4 mm×4 mm×7 mm, and two surfaces thereof were mirror polished (sample 1). This single crystal thin plate and a calcium metal piece were placed in a quartz tube, and the tube was then vacuum sealed. Five of the samples were maintained at 700° C. for different times, that is, 4, 12, 18, 40, and 240 hours (the crystal thin plates processed for different times are called sample 2, 3, 4, 5, and 6, respectively). As the holding time was increased, the C12A7 single crystal thin plates were sequentially colored in yellow, green, and black in that order; however, the surface layers were each transparent, and from an x-ray diffraction spectrum, it was confirmed that the surface layer is calcium oxide. It was understood from an x-ray diffraction pattern that a crystal thin plate obtained by removing the calcium oxide layer retains the crystal structure of C12A7.

However, from a relative intensity of an x-ray diffraction peak, it was understood that the free oxygen ions are extracted from the sample 6 which was maintained for 240 hours. FIG. 1 shows optical absorption spectra of samples 1 to 4. As the holding time at 700° C. is increased, the intensity of an optical absorption band having a peak at 2.8 eV is increased. This absorption band is associated with electrons confined in the cages, and the increase in absorption intensity indicates that the electron concentration is increased as the holding time is increased.

FIG. 2 shows optical absorption spectra of samples 5 and 6 obtained by the Kubelka-Munk method. The optical absorption band having a peak at 2.8 eV is increased, and hence it is understood that the concentration of electrons clathrated in the cages is further increased.

FIG. 3 shows the temperature dependence of the electrical conductivity of samples 1 to 6. As the holding time is increased, the electrical conductivity at room temperature is increased, and hence it is understood that the concentration of electrons in the cages is increased. From the optical diffused reflection and the electrical conductivity, the number of clathrated electrons per unit volume in sample 6 is $2 \times 10^{21}/cm^3$, and this value means that almost all the free oxygen ions are substituted with electrons. That is, when the above sample was held at 700° C. for 240 hours, an electride C12A7 compound represented by $[Ca_{24}Al_{28}O_{64}]^{4+}(4e^-)$ could be formed.

Example 2

After a fine powder of a C12A7 compound was molded by a uniaxial press under a pressure of 300 kg/cm², additional molding was performed by a hydrostatic pressure press under a pressure of 2,000 kg/cm². After two of the molded bodies thus formed were placed in respective carbon crucibles each capped with a lid, the crucibles were further placed in respective alumina crucibles, and heating was then performed at a temperature increasing rate of 400° C./hour to 1,550° C. for one crucible and to 1,600° C. for the other crucible. Subsequently, the crucibles were held at the above respective temperatures where the molded bodies are melted for 1 hour and were then cooled to room temperature at a temperature decrease rate of 400° C./hour for the solidification.

The solid materials thus obtained were dense and had black green color, and the degree of blackness of the solid material held at 1,600° C. was higher than that of the solid material held at 1,550° C. The electrical conductivities of the solid materials held at 1,550° C. and 1,600° C. were approximately 5 S/cm and 10 S/cm, respectively. From x-ray diffraction patterns, both solid materials had a single phase of C12A7, and the vertical direction of each of the solid ingot was strongly oriented in the <111> direction.

From the results described above, when the fine powder of the C12A7 compound processed by pressure molding was processed by heat treatment at 1,550° C. or 1,600° C., the free oxygen ion in the C12A7 compound could be substituted with electrons. In particular, when the fine powder was held at 1,600° C., almost all the free oxygen ions could be substituted with electrons in the solid, and as a result, an electride C12A7 compound represented by $[Ca_{24}Al_{28}O_{64}]^{4+}(4e^-)$ could be formed.

Comparative Example 1

After three samples made from a C12A7 powder were placed in respective carbon crucibles each capped with a lid, the crucibles were further placed in respective alumina crucibles, and heating at a temperature increasing rate of 400° C./hour was then performed for the respective crucibles to 1,480° C., 1,550° C. and to 1,600° C. Subsequently, the crucibles were held at the above respective temperatures for 1 hour and were then cooled to room temperature at a temperature decrease rate of 400° C./hour. The sample held at 1,480° C. was a transparent C12A7 and was an electrical insulator, so that no substitution of electrons for the free oxygen ions occurred. The samples held at 1,550° C. and 1,600° C. were decomposed into the C3A phase and the CA phase, and the C12A7 phase could not be obtained.

According to the results described above, it is understood that even when the sample is held at 1,600° C., the electride C12A7 compound represented by $[Ca_{24}Al_{28}O_{64}]^{4+}(4e^-)$ cannot be formed without performing hydrostatic pressure press molding for fine particles.

Example 3

A C12A7 thin film deposited on a MgO substrate was maintained at 600° C. and was implanted with $Ar^+$ ions accelerated at approximately 360 kV. The thin film before ion implantation showed insulating properties; however, when $Ar^+$ ions were implanted at a dose of $5 \times 10^{17}/cm^2$, an electrical conductivity of approximately 1 S/cm was obtained. From a Rutherford backscattering spectrum, it was confirmed that $Ar^+$ ions are not contained in the film.

Accordingly, it is believed that after $Ar^+$ ions collide with the free oxygen ions, the free oxygen ions are kicked out of the film by a knock-on effect, and as a result, in order to maintain the charge neutrality, electrons are allowed to remain in the film. That is, by implanting $Ar^+$ ions into a C12A7 thin film at high temperature, electrons are substituted for free the oxygen ions, and as a result, electrical conductivity can be realized.

Example 4

Figure 4:
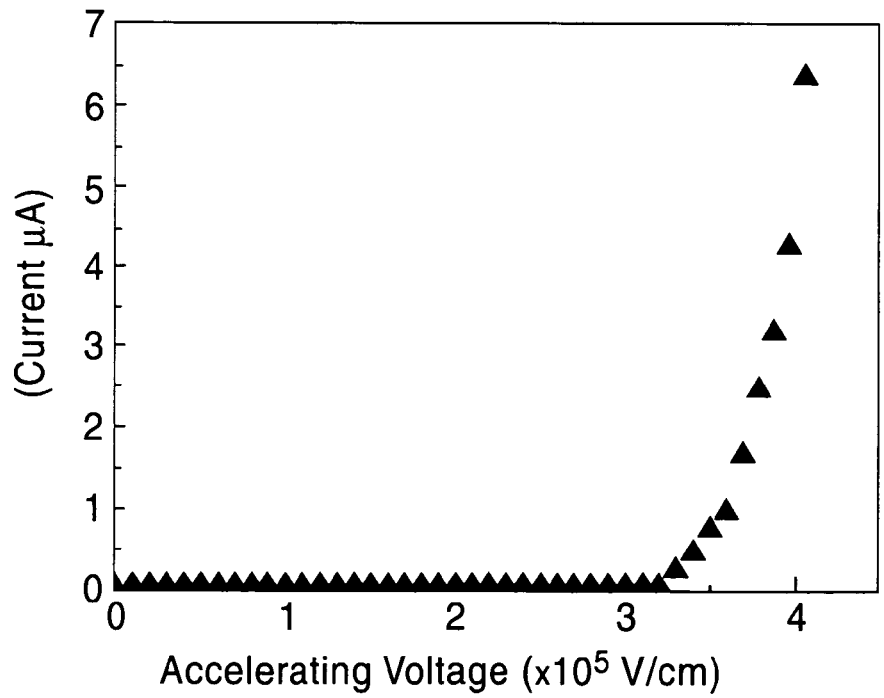
FIG. 4 is a graph showing the relationship between the acceleration voltage and the current of an electride C12A7 compound formed in example 1.

After a platinum electrode was formed on the rear surface of the electride C12A7 sample 6) formed in Example 1, and a copper electrode was provided in the other surface at a position 0.05 mm apart from the surface as a plus electrode, an accelerating voltage was applied between the two electrodes at room temperature. As shown in FIG. 4, at an accelerating voltage of approximately $3 \times 10^5$ V/cm, current started to flow. That is, it was understood that the electride C12A7 compound may serve as an electron emission material at room temperature. By the way, the accelerating voltage at which current starts to flow depends on surface conditions of the sample.

Example 5

After the electride sample 6) formed in Example 1 was directly brought into contact with a quartz glass plate and was vacuum sealed in a quartz tube, the compound was maintained at 800° C. for 5 minutes. A part of the quartz glass in contact with the electride was colored into brown. In addition, from a photoelectron spectrum of the colored part, it was found that silicon monoxide (SiO) is generated. That is, by contact with the electride, the quartz glass ($SiO_2$) was reduced to SiO, and hence it was shown that the electride can serve as a reducing agent functioning at a low temperature.

The invention claimed is:

1. A method for manufacturing a $12CaO \cdot 7Al_2O_3$ compound, a $12SrO \cdot 7Al_2O_3$ compound, or a mixed crystal compound containing $12CaO \cdot 7Al_2O_3$ and $12SrO \cdot 7Al_2O_3$ comprising: electrons substituted for free oxygen ions at a concentration of $1 \times 10^{18}$ to less than $1.1 \times 10^{21}/cm^3$ out of free oxygen ions contained in cages at a substitution ratio of the electrons to the free oxygen ions of 2 to 1, the concentration of the electrons being $2 \times 10^{18}$ to less than $2.2 \times 10^{21}/cm^3$ in the cages, wherein the electrical conductivity at room temperature is in the range of $10^{-4}$ S/cm to less than $10^3$ S/cm, comprising the step of: holding a single crystal $12CaO \cdot 7Al_2O_3$ compound or a hydrostatic pressure press molded material of a fine powder thereof, a single crystal $12SrO \cdot 7Al_2O_3$ compound or a hydrostatic pressure press molded material of a fine powder thereof, or a single crystal of a mixed crystal compound containing a $12CaO \cdot 7Al_2O_3$ compound and a $12SrO \cdot 7Al_2O_3$ compound or a hydrostatic pressure press molded material of a fine powder thereof at 600 to 800° C. for 4 to less than 240 hours in an alkaline metal vapor or an alkaline earth metal vapor, whereby electrons are substituted for the free oxygen ions.

2. The method for manufacturing the compound, according to claim 1, wherein sodium or lithium is used as the alkaline metal, and magnesium or calcium is used as the alkaline earth metal.

3. A method for manufacturing a compound, according to claim 1, comprising: melting one fine powder of the $12CaO.7Al_2O_3$ compound, the $12SrO.7Al_2O_3$ compound, and the mixed crystal compound containing a $12CaO.7Al_2O_3$ compound and a $12SrO.7Al_2O_3$ compound, followed by cooling and solidification, whereby electrons are substituted for the free oxygen ions.

4. The method for manufacturing the compound, according to claim 3, wherein a melt of one fine powder of the $12CaO.7Al_2O_3$ compound, the $12SrO.7Al_2O_3$, and the mixed crystal compound containing a $12CaO.7Al_2O_3$ compound and a $12SrO.7Al_2O_3$ compound is held at more than 1,550° C. to less than 1,650° C. for more than 1 minute to less than 2 hours in a reducing atmosphere, followed by slow cooling to room temperature.

5. The method for manufacturing the compound, according to claim 4, wherein the reducing atmosphere according to claim 4 is an atmosphere in a carbon crucible capped by a lid.

6. A method for manufacturing a $12CaO.7Al_2O_3$ compound, a $12SrO.7Al_2O_3$ compound, or a mixed crystal compound containing $12CaO.7Al_2O_3$ and $12SrO.7Al_2O_3$ comprising: electrons substituted for free oxygen ions at a concentration of $1 \times 10^{18}$ to less than $1.1 \times 10^{21}/cm^3$ out of free oxygen ions contained in cages at a substitution ratio of the electrons to the free oxygen ions of 2 to 1, the concentration of the electrons being $2 \times 10^{18}$ to less than $2.2 \times 10^{21}/cm^3$ in the cages, wherein the electrical conductivity at room temperature is in the range of $10^{-4}$ S/cm to less than $10^3$ S/cm, comprising the steps of: holding one thin film made of the $12CaO.7Al_2O_3$ compound, the $12SrO.7Al_2O_3$ compound, or the mixed crystal compound containing a $12CaO.7Al_2O_3$ compound and a $12SrO.7Al_2O_3$ compound at 500 to 1,400° C., and implanting rare gas ions (Ar, Kr, or Xe) into the thin film of the compound, whereby electrons are substituted for the free oxygen ions.

7. The method for manufacturing the compound, according to claim 1, wherein an electride $12CaO.7Al_2O_3$ compound comprising: electrons that are substituted for almost all the free oxygen ions contained in cages at a substitution ratio of the electrons (referred to as $e^-$) to the oxygen ions of 2 to 1, the electride $12CaO.7Al_2O_3$ compound being practically represented by $[Ca_{24}Al_{28}O_{64}]^{4+}(4e^-)$.

8. The method for manufacturing the compound, according to claim 1, wherein an electride $12SrO.7Al_2O_3$ compound comprising: electrons that are substituted for almost all the free oxygen ions contained in cages at a substitution ratio of the electrons to the oxygen ions of 2 to 1, the electride $12SrO.7Al_2O_3$ compound being practically represented by $[Sr_{24}Al_{28}O_{64}]^{4+}(4e^-)$.

9. The method for manufacturing the compound, according to claim 1, wherein a mixed crystal electride compound containing a $12CaO.7Al_2O_3$ compound and a $12SrO.7Al_2O_3$ compound, comprising: electrons that are substituted for almost all the free oxygen ions contained in cages at a substitution ratio of the electrons to the oxygen ions of 2 to 1, the mixed crystal electride compound being practically represented by $[(Ca_{1-x}Sr_x)_{24}Al_{28}O_{64}]^{4+}(4e^-)$.

* * * * *